Feb. 4, 1969   M. A. WACHTER   3,425,333
PRESSURE CONTROL VALVE FOR AIRCRAFT
Filed Sept. 5, 1967
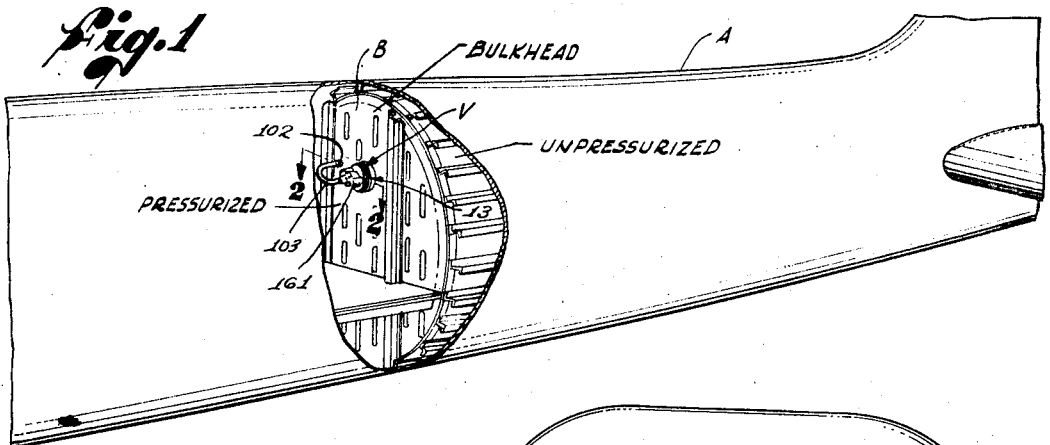
Fig. 1
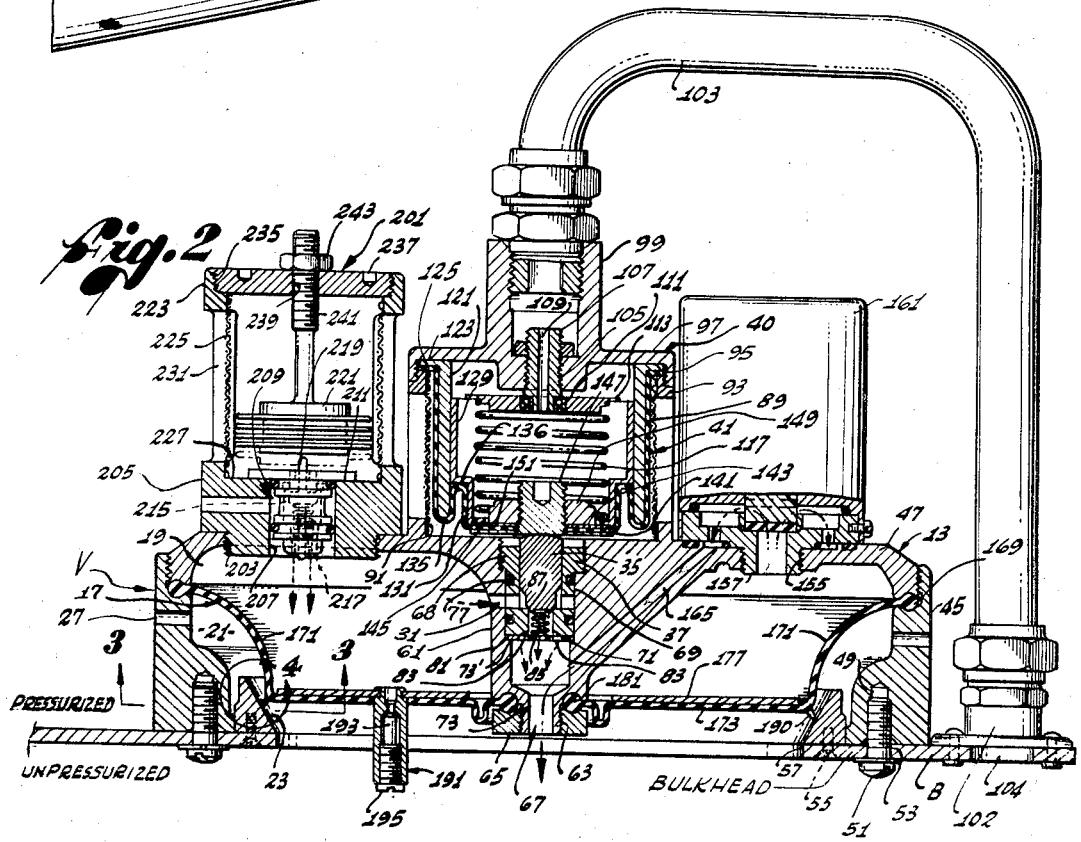
Fig. 2
Fig. 3
Fig. 4
INVENTOR.
MILLARD A. WACHTER
BY Fulwider, Patton, Rieber, Lee, and Utecht
ATTORNEYS

United States Patent Office 3,425,333
Patented Feb. 4, 1969

3,425,333
PRESSURE CONTROL VALVE FOR AIRCRAFT
Millard A. Wachter, 23305 Cohasset,
Canoga Park, Calif. 91304
Filed Sept. 5, 1967, Ser. No. 665,628
U.S. Cl. 98—1.5    10 Claims
Int. Cl. B64d *13/00*

ABSTRACT OF THE DISCLOSURE

A pressure control valve for controlling the pressure differential between the cabin of an aircraft and the atmospheric pressure. The pressure control valve includes a housing which forms a cylindrical cavity having an open end surrounded by a valve seat which defines a flow opening. A main diaphragm is supported from the housing and forms a flexible wall and a valve gate. The wall, when the valve gate is seated on the seat, cooperates with the housing to form an annular sensing chamber on the outside of the wall; the inside of the flexible wall, further, cooperates with the gate and back portion of the cavity to form a control chamber at the rear of the cavity. The housing also forms a cabin port for passage of air from the cabin to the cabin sensing chamber. The housing includes a relatively small bleed passage for communication of air from the cabin to the control chamber and a relatively large exhaust passage for passage of air from the central chamber to the atmosphere.

Valve means is provided for controlling air flow out the exhaust passage and is responsive to a pre-determined pressure differential between atmospheric and cabin pressure to exhaust said control chamber and enable the air in the cabin sensing chamber to act on the first flexible wall and move the gate from the valve seat.

BACKGROUND OF THE INVENTION

Field of the invention

The present invention relates generally to pressure control valves and more particularly to a pressure control valve having a high flow capacity and which is responsive to relatively small pressure changes.

Description of prior art

All present high capacity pressure control valves known to applicant which are responsive to small pressure changes are actuated by comparatively complex auxiliary systems such as vacuum systems.

Summary of the invention

An object of the present invention is to provide a pressure control valve for controlling pressure in an aircraft cabin. The valve includes a housing that forms a cavity which is open on one side and includes a peripheral valve seat around the open side, which seat forms a flow opening. A valve gate is supported from the housing by a flexible wall which cooperates with the housing, when the gate is seated on the valve seat, to define a control chamber on one side and a cabin sensing chamber on the other. The housing includes a cabin port for passage of cabin air into the sensing chamber.

The control chamber includes a relatively small bleed passage for communicating air from the cabin and a relatively large exhaust passage for communicating air from the control chamber to the atmosphere.

A poppet selectively blocks flow in the exhaust passage and is operated by a control means which includes a movable wall responsive to a predetermined pressure differential between cabin and atmospheric pressure. Thus, the cabin pressure is utilized to act across the movable wall and open the exhaust passage allowing the control chambers to exhaust to the atmosphere at a faster rate than air bleeds in the bleed passage thus enabling the cabin pressure in the cabin sensing chamber to act on the first flexible wall and lift the gate from the seat thereby allowing the cabin to vent out through the cabin port and out the open side of the housing.

Description of the drawings

FIG. 1 is a fragmentary, partially broken away, prespective view of the tail portion of an aircraft in which a pressure control valve embodying the present invention is installed;

FIG. 2 is a horizontal sectional view, in enlarged scale, taken along the lines 2—2 of FIG.1;

FIG. 3 is a partial vertical sectional view taken along the lines 3—3 of FIG. 2; and FIG. 4 is a partial horizontal sectional view, in enlarged scale, taken from the circle designated 4 in FIG. 2.

Description of the preferred embodiments

The aircraft A shown in FIG. 1 includes a vertical bulkhead B separating a forward pressurided portion of the aircraft from a rearward unpressurized portion. A pressure control valve V, embodying the present invention, is mounted on the forward side of the bulkhead B for regulating the pressure in the pressurized forward compartment at a predetermined pressure differential above that of the unpressurized aft compartment. Many airplanes include a pressurization unit (not shown) which supplies air to the pressurized cabin at a constant rate and the valve V is utilized to control flow from the cabin to maintain the desired pressure.

Referring to FIG. 2, the valve V includes a housing, generally designated 13, that forms a downwardly opening cylindrically shaped cavity which is divided into two chambers by a main diaphragm, generally designated 17. The diaphragm 17 divides the cavity into a central control chamber 19 and an annular cabin sensing chamber 21. A peripheral valve seat 23 is mounted at the open side of the cavity and is abutted by the diaphragm 17 to restrict flow from the chamber 21. Cabin air flows into the cabin sensing chamber 21 through radially extending ports 27.

Positioning of the diaphragm 17 against or away from the seat 23 is effected by pressurizing the control chamber 19 relative to atmospheric pressure in the outside of the diaphragm 17. Air is evacuated from the control chamber 19 through an exhaust passage 31 and flow through the passage is controlled by a poppet 35. The body of the poppet 35 loosely fits its surrounding housing or insert 37 to enable cabin air to bleed through the annular space between the poppet 35 and housing 37 and into the passage 31. The poppet 35 is controlled by control means 40 which includes a control diaphragm 41, the outside of which diaphragm 41 is subjected to cabin pressure and the inside of which diaphragm is subjected to atmospheric pressure.

The housing 13 includes a cylindrically shaped hollow shell 45 which has internal threads on its upper end for mating with a base fitting 47, the outer periphery of the diaphragm 17 being held captive between the shell 45 and the base fitting 47. The lower face of the shell 45 includes a plurality of spaced threaded bores 49 for receiving mounting screws 51 which extend through bores 53 in the bulkhead B. The valve seat 23 is generally ring shaped and includes a plurality of spaced bores for receiving mounting screws 55 which extend through the bulkhead B and screw into the seat 23. The bulkhead B includes a circular cutout 57 which is shaped to complement the inner perimeter of the ring shaped valve seat 23.

The central portion of the base fitting 47 is formed with a downwardly projecting portion 61 which is reduced in diameter at its lower extremity to form a stud 63 for receiving a retaining nut 65. A bore, generally designated 67 extends vertically through the center of the downwardly projecting portion 61 and is threaded at its upper extremity 68 for receiving the threaded portion of the insert 37. The bore 67 is reduced in diameter at 69, again at 71, and still again at 73. A shoulder 73 is formed by the reduction in diameter of the bore 67 at 71 and a spring retainer 81 rests thereon. The retainer 81 includes a plurality of orifices 83 for receiving flow from the passage 31. A compression spring 85 is interposed between the poppet 35 and spring retainer 81 to bias the poppet upwardly off the seat 87 formed in the insert 37.

The control means 40 for limiting upward movement of the poppet 35 includes a cylindrically shaped screen 89 which has its lower end received in a circular depression 91 formed in the top of the base fitting 47. A ring shaped end fitting 93 is affixed to the upper end of the screen 89 and includes external threads at 95 for mating with internal threads included in a cap 97. The cap 97 includes a central boss 99 which has a threaded internal bore for connecting with the end fitting of an atmosphere sensing tube 103. The other end of the tube 103 is connected with a bulkhead fitting 102 for sensing atmospheric pressure through a sensing hole 104 in the bulkhead B. The horizontal wall of the cap 97 includes a threaded central bore 105 for receiving a bearing stud 107 which includes a vertical bore 109. The lower end of the bearing stud 107 bears against a ball bearing assembly 111 which is included in the central portion of a spring retainer 113 which spring retainer compresses the compression spring 117.

A cylindrically shaped diaphragm sleeve 121 includes an outwardly turned collar 123 at its upper extremity, which collar 123 is sandwiched between the cap 97 and fitting 93, along with the outwardly turned upper extremity 125 of the diaphragm 41. A cylindrically shaped spring guide 129 is slidably received within the sleeve 121 and is reduced in diameter at its lower portion 131 for guiding the lower extremity of the spring 117. The diaphragm 41 is generally cylindrically shaped and is slid over the sleeve 121 and extends downwardly therealong and is turned inwardly over the lower end 135 of the sleeve 121 and then extends upwardly along the inside of the sleeve and turns back on itself at 137 from where it extends along the outside of the reduced portion 131 of the spring guide 129 and then turns inwardly to form a horizontal wall 141. The horizontal wall 141 is sandwiched between a washer 143 and a bearing plate 145 which includes a centrally located upwardly projecting stud 147. A nut 149 is screwed on the stud 147 and presses the washer 143 and plate 145 together sandwiching the horizontal wall 141 of the diaphragm 41. The lower extremity of the spring guide 129 is turned inwardly to form a peripheral lip 151 which projects inwardly over the outer periphery of the washer 143 and is pressed downwardly thereon by the lower end of the spring 117.

The upper wall of the housing 47 includes a threaded vertical bore 155 for receiving the inlet fitting 157 of a solenoid actuated valve 161. The solenoid valve 161 controls flow from the control chamber 19 and out an auxiliary passage 165 formed in the housing 47.

The main diaphragm 17 is generally circularly shaped and includes a rib 169 around its outer periphery for enhancing sealing between the shell 45 and base fitting 47. The diaphragm 17 is made of rubber and forms a flexible wall, and a gate 173 for blocking flow out the opening defined by the seat 23. A washer shaped plate 177 is mounted on the back side of the gate 173 for providing rigidity. A sealing rib 181 is formed in the central portion of the diaphragm 17 and defines an opening for projection of the stud 63 of the projecting portion 61, which rib 181 is sandwiched under the nut 65. A series of resilient prongs 190 are arranged around the outer circumference of the gate 173 for contacting the seat 23 and yieldingly resisting full closing of the gate to dampen oscillation thereof, as shown in FIGS. 3 and 4.

An orifice assembly 191 is mounted on the diaphragm 17 and includes a longitudinal passage 193 for passage of air from the control chamber 19. The rate of flow through the passage 193 can be adjusted by an adjustment screw 195 screwed into the threaded lower portion of the passage 193.

An isobaric control assembly, generally designated 201, is mounted in an internally threaded bore 203 in the horizontal wall of the base fitting 47. The control assembly 201 includes a connecting fitting 205 which has a threaded portion which screws into the bore 203. The fitting 205 forms a central vertical bore 207 for receiving a valve, generally designated 209. The valve 209 includes a horizontal upper mounting plate 211 which is attached to the top surface of the fitting 205 with the valve body extending into the bore 207. The valve 209 includes a poppet 215 which is biased upwardly against its seat by a coil compression spring 217. The poppet 215 includes an upwardly projecting actuating stem 219 which is actuated by an aneroid 221. A cylindrically shaped screen 225 has its lower end projecting into a circular depression 227 formed in the top surface of the fitting 205 and the base fitting 205 includes upwardly extending struts 231 which support a fitting 233 at their upper ends. The fitting 233 is internally threaded at 235 for receiving an externally threaded top plate 237 which has a threaded central bore 239 for receiving a mounting stud 241 of the aneroid 221. A set nut 243 is screwed over the end of the stud 241 to lock the aneroid 221 in position.

In operation, the valve V is attached to the bulkhead of an aircraft A as shown in FIG. 1, and as the aircraft gains altitude the pressure on the inside of the control diaphragm 41 will be decreased since the sensing tube 103 is exposed to the high altitude atmosphere through the port 104 in the bulkhead B. Considering operation of the control means 40, when the pressure inside the control diaphragm 41 has been reduced to the point where the cabin pressure acting upon the horizontal wall 141 is sufficient to overcome the bias of the spring 117 and lift the bearing plate 145 out of contact with the poppet 35 the passage 31 will be opened to allow flow from the control chamber 19 and out the bore 67. Since the annular bleed passage between the poppet 35 and insert 37 restricts any bleed from the cabin to a relatively low rate the pressure in the control chamber 19 will be reduced due to the loss of air out the exhaust passages 31 and 67. Thus the pressure in the chamber 21 will, however, remain at cabin level and will push the flexible wall 171 up lifting the gate 173 away from the seat 23 and allowing air to flow from the cabin, into the ports 27, and out the opening defined between the gate 173 and seat 23.

When the pressure in the aircraft cabin has been reduced to the point where the pressure acting upon the bottom of the horizontal wall 141 of the diaphragm 41 is insufficient to overcome the bias of the spring 117, such spring 117 will overcome the spring 85 and force the poppet 35 closed and thus stop flow from the control chamber 19. While the aircraft A continues to ascend the atmospheric pressure will continue to drop below the cabin pressure and air will continue to bleed through the annular bleed space between the poppet 35 and insert 37 and in through the passage 31 into the control chamber 19. The pressure buildup in the control chamber 19 will be effective to force the diaphragm 17 down against the seat 23 and discontinue air flow from the cabin, out through the opening defined between the gate 173 and seat 23. As described hereinabove, the prongs 190 yieldingly resist full closing of the gate 173 to dampen oscillation of the gate.

Turning now to the function of the isobaric control assembly 201, the aneroid 221 is evacuated to a relatively high vacuum, as for instance 10 microns, and adjusted so that the actuating stem 219 is just contacted at sea level. Thus, when the aircraft A ascends, the aneroid 221 will expand causing the poppet 215 to be forced from its seat, enabling cabin air to flow there around and into the control chamber 19. The bleed orifice assembly 191 is adjusted such that air flow there out of is at a lesser rate than air flow in through the valve 209. Thus, pressure will gradually build up in the control chamber 19 and maintain the gate 173 biased towards its closed position against the valve seat 23. Consequently, the position of the gate 173 relative to the seat 23 is always determined with reference to the absolute pressure of the cabin, rather than depending on the differential pressure between the cabin and atmosphere. Consequently, flow out the pressure control valve V will be proportional to the cabin pressure to maintain the cabin at a constant pressure, rather than having the cabin pressure decrease with increasing altitude.

It will be clear that the actuating pressure of the control diaphragm 41 can be adjusted by adjusting the stud 107 to effect the desired bias on the compression spring 117. Also, the actuating pressure of the aneroid 221 can be adjusted by adjusting the mounting stud 241 in its bore 239.

If at any time during the flight of the aircraft A, the cabin should over pressurize to the point where the cabin pressure is approaching the critical design pressure of the fuselage, the solenoid 161 could be opened to dump the air from the control chamber 19 out the auxiliary passage 165. This dumping of the air from the control chamber 19 would enable the cabin pressure in the cabin chamber 21 to press against the wall 171 and lift the gate 173 rapidly away from the seat 23 to provide for quickly dumping the air in the aircraft cabin thus reducing the cabin pressure.

If desired, a timing device (not shown) could be included in the pressure control valve V to regulate the rate of pressure change in the cabin for the comfort of the passengers.

The valve shown in the preferred embodiment has been proven to have exceptionally accurate control, as for instance within a plus 0 p.s.i. and a minus one-tenth of a p.s.i. of the control setting. Since the pressure differential between the cabin and atmosphere is utilized to drive the poppet 35 and actuate the main diaphragm 17, the pressure control valve V has exceptionally rapid response. Provision of the isobaric control assembly 201 enables maintenance of a constant pressure in the aircraft cabin, regardless of the altitude. Further, the solenoid valve 161 enables the pilot to open the auxiliary passage 165 to dump air from the aircraft cabin to lower its pressure in case of an emergency.

Various modifications and changes may be made with regard to the foregoing detailed description without departing from the spirit of the invention or the scope of the following claims.

I claim:
1. A pressure control valve for controlling the cabin pressure in an aircraft cabin at a predetermined pressure differential from the atmospheric pressure, said valve including;
   a housing having a cavity which is open on one side;
   a peripheral valve seat adjacent the open side of said cavity and defining an air flow opening;
   a valve gate for seating against said valve seat to block air flow through said air flow opening;
   a first flexible wall connecting said valve gate with said housing, the outside of said wall cooperating with said housing when said gate is closed to define a cabin pressure sensing chamber, and the inside of said wall cooperating with said gate and housing to define a primary flow control chamber;
   a cabin port in the housing for passage of air from said cabin to said sensing chamber;
   a relatively small flow rate bleed passage in the housing for bleeding air from said cabin to said control chamber;
   a relatively large flow rate exhaust passage in said housing for communication of air from said central chamber to said atmosphere outside of said cabin; and
   valve means for controlling air flow out said exhaust passage, said means being responsive to said predetermined pressure differential to open said exhaust passage to lower the pressure in said primary control chamber below the cabin pressure and enable the pressure in said cabin sensing chamber to lift said flexible wall to move said gate from said seat and open said air flow opening thereby allowing air flow from said cabin, out said cabin port and said air flow opening.

2. A pressure control valve as set forth in claim 1 wherein said gate and first flexible wall are in the form of a diaphragm.

3. A pressure control valve as set forth in claim 1 wherein said housing includes
   an auxiliary passage for communicating air from said flow control chamber to the atmosphere;
   and wherein said valve includes means for controlling flow through said auxiliary passage.

4. A flow control valve as set forth in claim 1 wherein said valve gate includes
   resilient prongs spaced around its periphery for contacting said valve seat and yieldingly resisting closing of said gate on said seat to dampen movement of said gate relative to said seat.

5. A pressure control valve as set forth in claim 1 wherein said valve means includes:
   a valve poppet for selectively blocking flow through said exhaust passage;
   pressure control means for positioning said poppet and including a movable wall drivingly engaging said poppet and having its poppet side adapted for communication with said atmospheric pressure and its opposite side adapted for communication with cabin pressure;
   a flexible wall supporting said movable wall from said valve; and
   biasing means for maintaining said poppet closed until the pressure differential across said movable wall reaches said predetermined pressure differential.

6. A pressure control valve as set forth in claim 5 wherein said movable wall and second flexible wall included in said pressure control means are in the form of a diaphragm.

7. A pressure control valve as set forth in claim 5 wherein said control means includes
   biasing means for cooperating with said predetermined pressure differential to overcome said first mentioned biasing means to bias said poppet open when the pressure differential across said diaphragm reaches said predetermined differential.

8. A pressure control valve as set forth in claim 5 wherein said biasing means for biasing said poppet closed is adjustable to enable said valve to be adjusted to open at selected pressure differentials.

9. A pressure control valve as set forth in claim 1 that includes:
   an orifice of predetermined size for passage of air from said control chamber to the atmosphere;
   a cabin passage for communication of air from said cabin to said control chamber;
   a valve for controlling air flow through said cabin passage;

pressure responsive control means for controlling said valve, said control means being responsive to the cabin pressure to progressively open said valve as said cabin pressure decreases thereby progressively increasing the pressure in said control chamber to press said gate toward its closed position against said seat.

10. A pressure control valve as set forth in claim 9 wherein said pressure responsive control means includes an aneroid.

References Cited

UNITED STATES PATENTS

| 2,590,330 | 3/1952 | Krueger | 98—1.5 |
| 2,672,086 | 3/1954 | Jensen | 98—1.5 |
| 2,814,241 | 11/1957 | Silver | 98—1.5 |
| 2,986,990 | 6/1961 | Fischer | 98—1.5 |

MEYER PERLIN, *Primary Examiner.*